(12) United States Patent
Bertelsen et al.

(10) Patent No.: US 6,715,574 B1
(45) Date of Patent: Apr. 6, 2004

(54) AIRSTREAM CONTROL SYSTEM FOR A HOVERCRAFT

(75) Inventors: William R Bertelsen, Rock Island, IL (US); John W Grant, Kewanee, IL (US)

(73) Assignee: Aeromobile, Inc., Neponset, IL (US)

( * ) Notice: Subject to any disclaimer, the term of this patent is extended or adjusted under 35 U.S.C. 154(b) by 0 days.

(21) Appl. No.: 10/274,088

(22) Filed: Oct. 18, 2002

(51) Int. Cl.$^7$ .................................................. B60V 1/11
(52) U.S. Cl. ...................................................... 180/122
(58) Field of Search ................................. 180/116, 117, 180/122, 124, 127, 128; D12/5

(56) References Cited

U.S. PATENT DOCUMENTS

| | | | |
|---|---|---|---|
| 3,090,455 A | * 5/1963 | Crowley | 180/117 |
| 3,335,977 A | * 8/1967 | Meditz | 244/12.4 |
| 3,463,264 A | 8/1969 | Duthion et al. | |
| 3,712,406 A | 1/1973 | Bertelsen | |
| 3,827,527 A | 8/1974 | Bertelsen | |
| 3,845,716 A | 11/1974 | Bertelsen | |
| 4,158,399 A | 6/1979 | Rickards | |
| 4,175,637 A | 11/1979 | Bertelsen | |
| 4,724,786 A | * 2/1988 | Guezou et al. | 114/67 A |
| 4,828,058 A | 5/1989 | Bjorn-Ake | |
| 5,429,359 A | * 7/1995 | Timperman et al. | 473/471 |
| 5,873,545 A | * 2/1999 | Kapin et al. | 244/12.3 |
| 5,967,666 A | * 10/1999 | Johnson | 384/12 |

FOREIGN PATENT DOCUMENTS

| | | | |
|---|---|---|---|
| AU | 468609 | | 1/1972 |
| JP | 3--79465 | * | 4/1991 |

* cited by examiner

Primary Examiner—Avraham Lerner
(74) Attorney, Agent, or Firm—Charles E. Bruzga

(57) ABSTRACT

Three aspects are disclosed of an airstream control system for a hovercraft that includes a platform and a lift gas chamber beneath the platform. Firstly, the system includes an impeller for receiving air at an inlet and discharging pressurized air at an outlet as an airstream. The impeller is positioned above an orifice of the lift gas chamber. The impeller is supported along a first axis transverse to the airstream and about which the impeller is rotatable by a first axis frame that is rotatable about a pair of first axis supports fixed to the platform. The impeller is further supported along a second axis transverse to the airstream and about which the impeller is rotatable by a second axis frame that is attached to the first axis frame and that comprises a first arm supporting a first point of the impeller and extending upstream of the impeller. A first channel arrangement fixed to the platform can receive the first arm of the second axis frame so as to allow a higher degree of tilting of a main axis of the impeller from vertically downward than in the absence of the first channel arrangement. Secondly, the system may include an arrangement to substantially seal the orifice or the lift gas chamber downstream of the impeller from upward flow of air. Thirdly, the system may include a stator positioned downstream of the impeller to prevent various airflow problems when the impeller is titled at 90 degrees from vertically downward.

23 Claims, 12 Drawing Sheets

AIRSTREAM CONTROL SYSTEM FOR A HOVERCRAFT

FIELD OF THE INVENTION

This invention relates to an airstream control system for a hovercraft, and more particularly to an airstream control system in which an impeller can be rotated from a position providing high lift to a position providing high thrust in addition to providing lift.

BACKGROUND OF THE INVENTION

U.S. Pat. No. 3,827,527 (the '527 patent), issued to William R. Bertelsen, one of the present inventors, describes a ground effect vehicle, commonly known as a hovercraft. The '527 patent discloses an impeller mounted on a gimbal framework, which includes a generally horizontally positioned ring. The ring has a first axis passing from one point of the ring to a second point of the ring and in between which the impeller is rotatably mounted. The gimbal framework further includes a second axis, transverse to the first axis and passing from a third point of the ring to a fourth point of the ring. The third and fourth points of the ring are rotatably mounted to a stationery platform of the hovercraft.

The gimbal framework of the '527 patent beneficially has allowed the impeller to be rotated to different positions to produce an airstream for lifting the hovercraft up above a surface such as land or water, and also to produce thrust to move the craft in a horizontal direction. More particularly, by being mounted in the gimbal framework, the impeller can be oriented to direct an airstream straight downwardly into a lift air chamber, for lifting the hovercraft. Considering the foregoing vertical orientation as 0 degrees, the impeller can be practically rotated up to an angle limited to about 30 degrees. This is due to the ring of the gimbal framework, which surrounds the impeller and abuts against structure forming an orifice to a lift air chamber beneath the impeller. Nevertheless, this arrangement beneficially allows a large degree of maneuverability of the hovercraft.

The present invention relates to further innovation to allow an impeller to extend its degree of rotational movement from having its airstream oriented at 0 degrees, or vertically downward into a lift chamber, to an angle that substantially exceeds 30 degrees and that may even reach 90 degrees. This would allow an impeller to provide a higher degree of thrust, permitting greater maneuverability of the hovercraft in terms of both direction and speed.

SUMMARY OF THE INVENTION

Three preferred aspects of the invention may be included in an airstream control system for a hovercraft that includes a platform and a lift gas chamber beneath the platform. According to a first preferred aspect, the system includes an impeller for receiving air at an inlet and discharging pressurized air at an outlet as an airstream. The impeller is positioned above an orifice of the lift gas chamber. The impeller is supported along a first axis transverse to the airstream and about which the impeller is rotatable by a first axis frame that is rotatable about a pair of first axis supports fixed to the platform. The impeller is further supported along a second axis transverse to the airstream and about which the impeller is rotatable by a second axis frame that is attached to the first axis frame and that comprises a first arm supporting a first point of the impeller and extending upstream of the impeller. A first channel arrangement fixed to the platform can receive the first arm of the second axis frame so as to allow a higher degree of tilting of a main axis of the impeller from vertically downward than in the absence of the first channel arrangement.

Beneficially, the foregoing aspect of the invention allows tilting of the impeller substantially more than in the above-mentioned prior art. In a preferred embodiment, the impeller can be titled up to 90 degrees from vertically downward for maximum thrust.

According to a second preferred aspect, the system may include an arrangement to substantially seal the orifice to the lift gas chamber downstream of the impeller from upward flow of air. According to a third preferred aspect, the system may include a stator positioned downstream of the impeller to prevent various airflow problems when the impeller is titled at 90 degrees from vertically downward.

DETAILED DESCRIPTION OF THE INVENTION

Figure 1A:
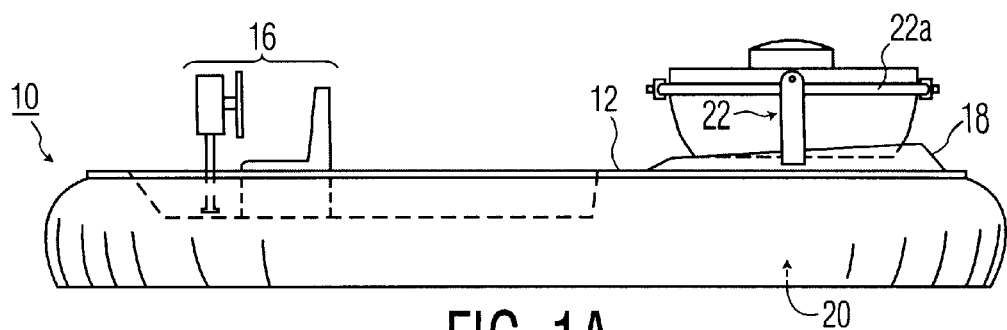
FIG. 1A is a side view of a hovercraft according to the prior art.
Figure 1B:
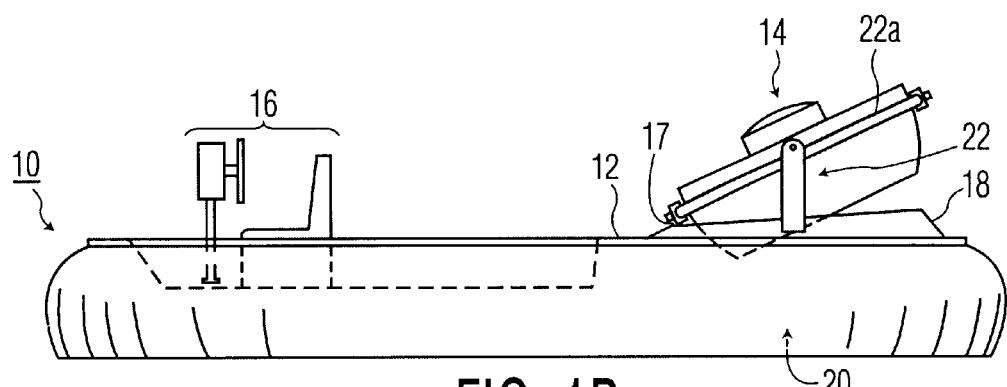
FIG. 1B is a side view showing an impeller in a tilted position for providing both thrust and lift.
Figure 1C:
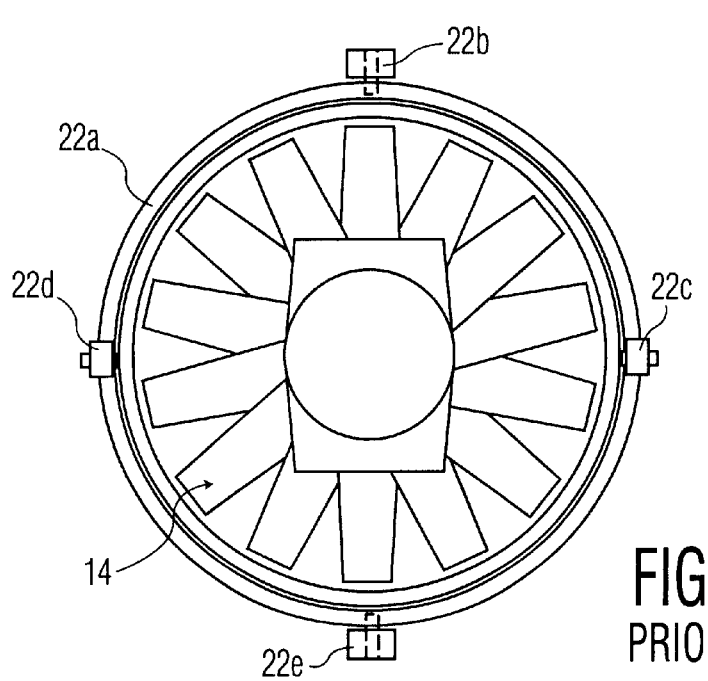
FIG. 1C is a simplified top view of the impeller of FIG. 1A and an arrangement for mounting the impeller to the platform of the hovercraft.

The present invention relates to improvements over the prior art shown, for instance in FIGS. 1A–1C. FIGS. 1A–1C shows a hovercraft 10 with a platform 12, impeller 14, and seating and control area 16 for an operator. Referring to FIG. 1A, a generally conically shaped shrouding, or cone, 18, higher at its aft (or rear) end, helps direct downward air flow from impeller 14 into a lift air chamber generally designated 20. As is known, lift air provided to the lift air chamber is directed downwardly, beneath the hovercraft, to lift the craft above land or water.

To move the hovercraft across land or water, the impeller is titled as shown, for instance, in FIG. 1B. In the position shown, impeller 14 directs an airstream (not shown) rearwardly so as to produce forward thrust for the craft. FIG. 1B shows impeller 14 titled about 30 degrees from directly vertically downward, which is considered as 0 degrees. This is the maximum tilt possible due to the gimbal arrangement 22 mounting the impeller to platform 12 of the craft.

Referring to FIG. 1C, gimbal arrangement 22 includes a ring 22a surrounding the lateral periphery of impeller 14. Supports 22b and 22c from the platform are rotatably connected to the lateral sides of impeller 14 to allow fore-aft rotation of the impeller. Further supports 22d and 22e are rotatably connected to the fore an aft sides of impeller 14 to allow transverse (or right-left) rotation of the impeller.

Referring again to FIG. 1B, ring 22a of the gimbal arrangement 22 extends beyond the lateral periphery of impeller 14, and, as a limitation on the degree of aft tilting of the impeller, impacts at 17 on cone 18. Theoretically, an orifice to the lift gas chamber 20, beneath the impeller, could be enlarged to accommodate a greater degree of tilting of the impeller. But, enlargement of such orifice would create a gap between the impeller and cone 18 so as to deleteriously result in loss of lift air from the lift air chamber 20.

The further figures show three general improvements over the prior art shown in FIGS. 1A–1C, for instance. These relate to (1) permitting titling of the impeller to angles above the approximately 30 degree limit of the prior art to angles that may even reach 90 degrees, (2) sealing the orifice to the lift gas chamber upstream of the impeller, and (3) using a stator to reduce turbulence, etc.

I. Higher Degree of Tilting of Impeller

Figure 2A:
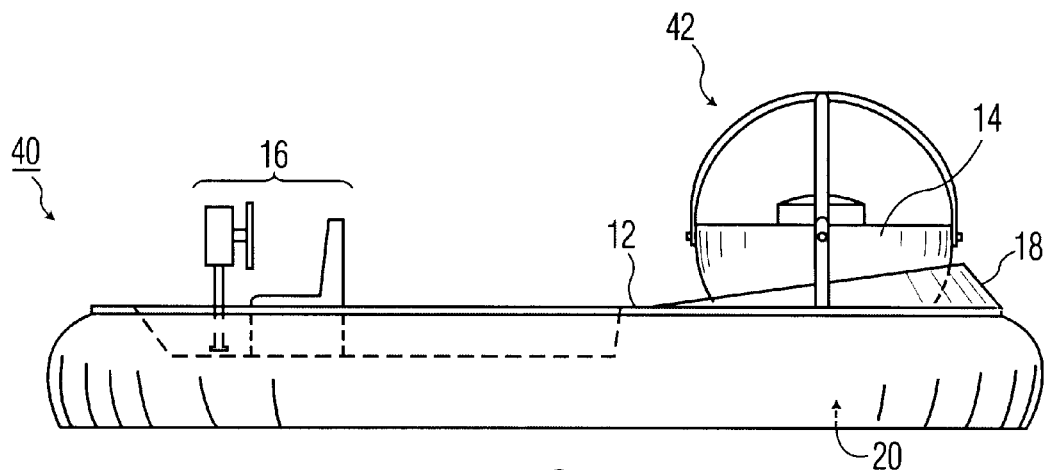
FIG. 2A is a side view of a hovercraft according to the present invention.

FIG. 2A shows a hovercraft 40 incorporating various improvements over the prior art shown in FIGS. 1A–1C, for instance. Like reference numbers as between the foregoing prior art figures and subsequent figures refer to like parts, so their further description will be omitted. In hovercraft 40, impeller 14 is mounted by framework generally indicated by arrow 42. The position of impeller 14 in FIG. 2A is comparable to that of impeller 14 in prior art FIG. 1A; that is, directed straight downwardly, or at 0 degrees. This provides maximum lift for the hovercraft for a given impeller speed.

Figure 2B:
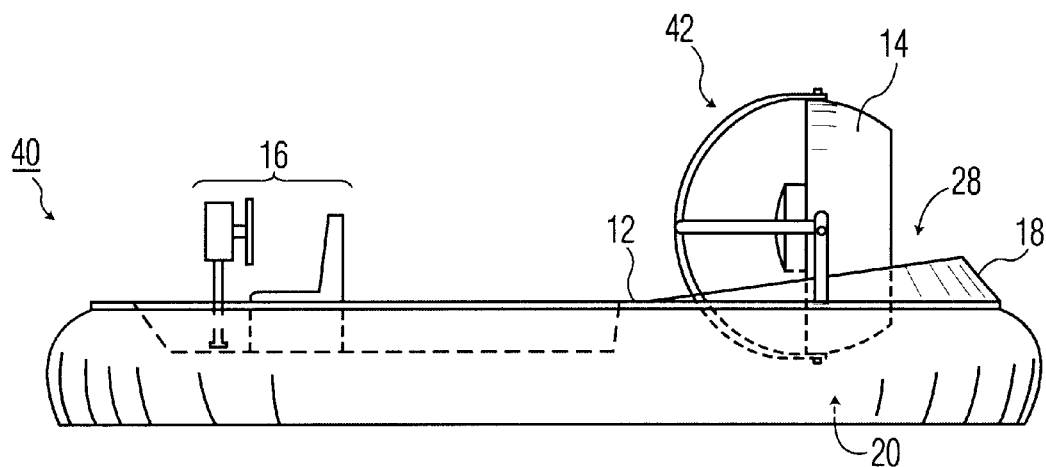
FIG. 2B is a side view showing an impeller in a tilted position for providing a high degree of thrust as well as lift.

FIG. 2B shows the hovercraft with impeller 14 rotated to direct its airstream (not shown) rearwardly to obtain maximum forward thrust for a given impeller speed. In this position, impeller 14 is rotated fully to 90 degrees counter-clockwise from its orientation shown in FIG. 2A. The ability to tilt the impeller substantially more than in the prior art of FIGS. 1A–1C, and to even reach substantially 90 degrees, relates to a first aspect of the present invention, as described more fully below.

Figure 3:
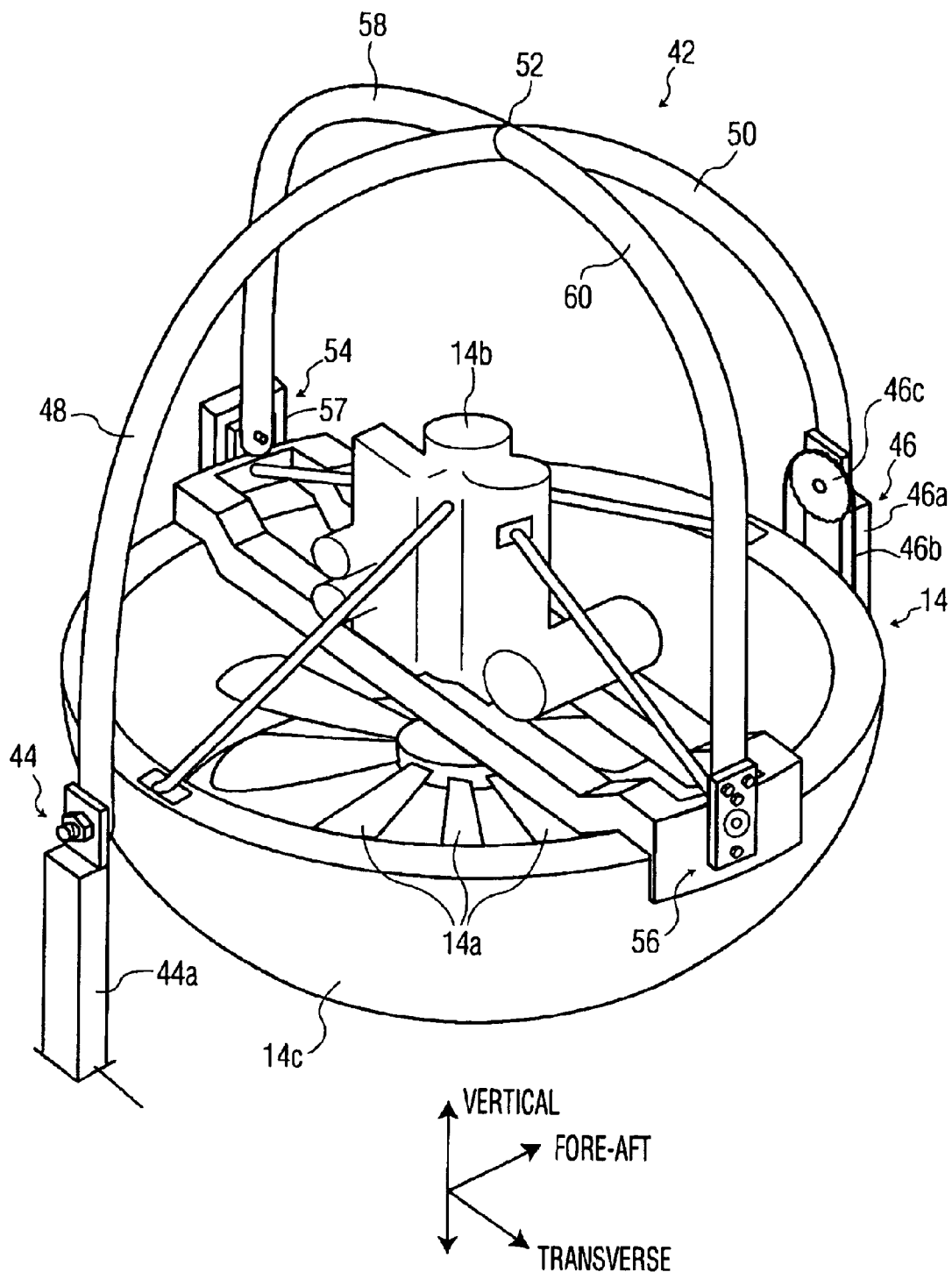
FIG. 3 is a perspective view of the impeller and mounting arrangement for the impeller of FIGS. 2A and 2B.

FIG. 3 more fully shows mounting arrangement 42 for impeller 14, as well as details of the impeller. Regarding the impeller, FIG. 3 shows impeller or fan blades 14a, impeller motor and bracing 14b, and impeller shrouding 14c.

Rotational mounts 44 and 46 define a fore-aft axis, allowing impeller 14 to rotate in the fore or aft directions. Mounts 44 and 46 are attached to platform 12 (e.g., FIG. 2A). Chain 46b, gear 46c and an associated control arrangement (not shown), collectively forming a rotary actuator, impart rotational movement of the impeller about the fore-aft axis. Support arms 48 and 50, which may be joined together at point 52 transfer rotational movement to impeller 14 via movement of point 52.

Rotational mounts 54 and 56 define a transverse (or right-left) axis, allowing impeller 14 to rotate in the right or left directions. Mounts 54 and 56 are attached to preferably opposing sides of impeller 14, which may be fore and aft positions. These mounts enable transverse rotation of the impeller, for example, to direct thrust air towards the right or left of the craft. In a similar manner as chain 46b and gear 46c are used to rotate the impeller about the fore-aft axis, a rotary actuator 57 imparts rotational movement to the impeller about the transverse axis. Support arms 58 and 60 support impeller 14 via mounts 54 and 56, respectively. Arms 58 and 60 preferably join support arms 48 and 50 at point 52, so as to define a cruciate mount for the impeller.

Figure 4:
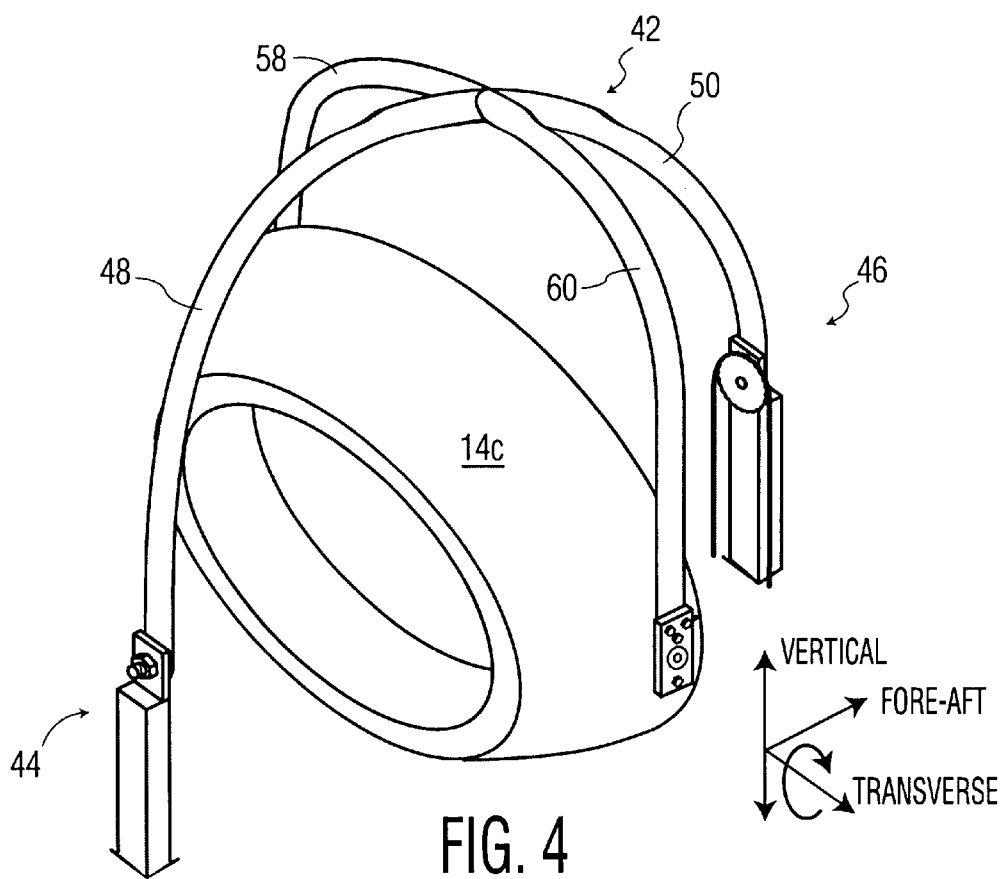
FIGS. 4 and 5 are similar to FIG. 3 but are more simplified.
Figure 5:
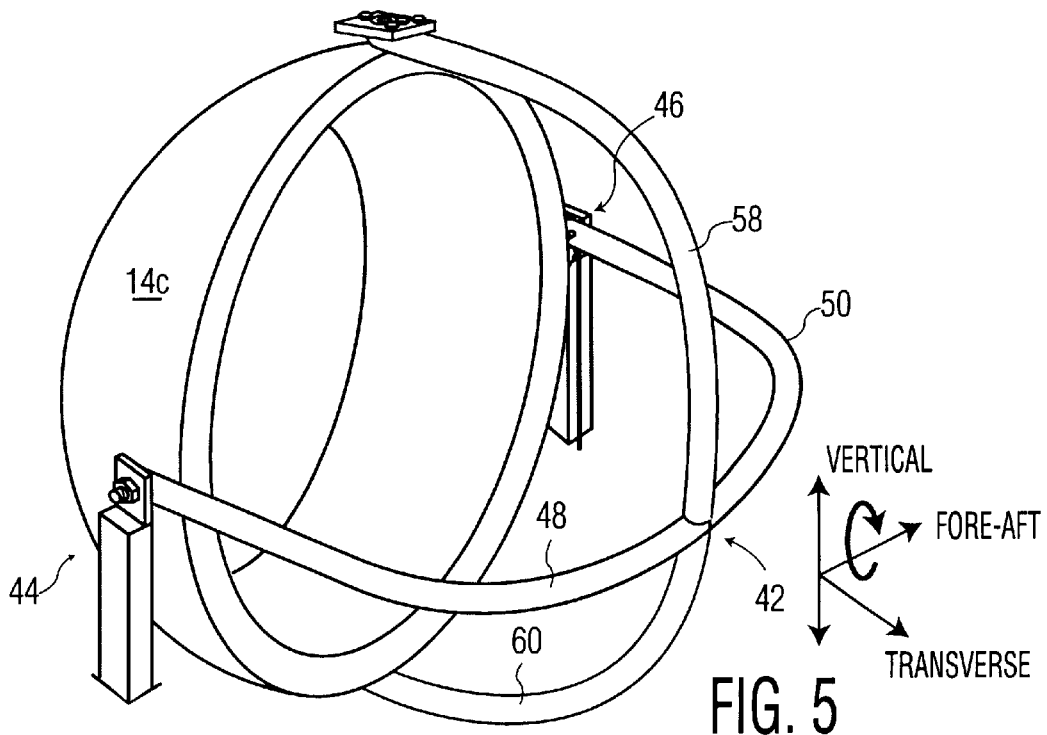

FIGS. 4 and 5 are simplified, perspective views of shrouding 14c and mounting framework 42 for the impeller 14 of FIG. 3. Various portions of the impeller have been removed for clarity. FIG. 4 shows impeller shrouding 14c tilting about the transverse axis of the impeller. FIG. 5 shows impeller shrouding 14c tilting about the fore-aft axis of the impeller.

Figure 6A:
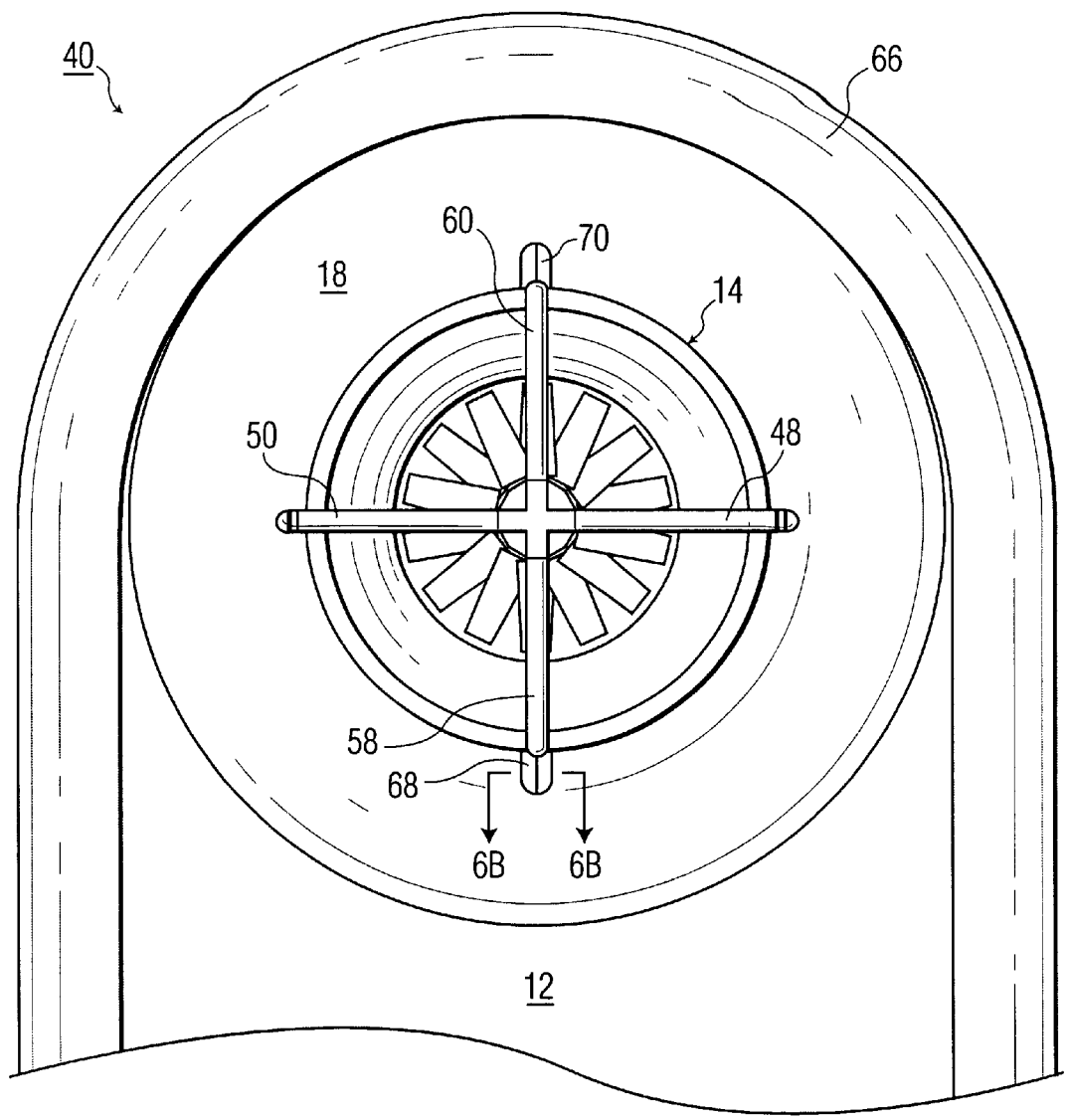
FIG. 6A is a top view of an aft portion of the hovercraft of FIG. 2A, for instance, including the impeller and a mounting arrangement for the impeller.
Figure 6B:
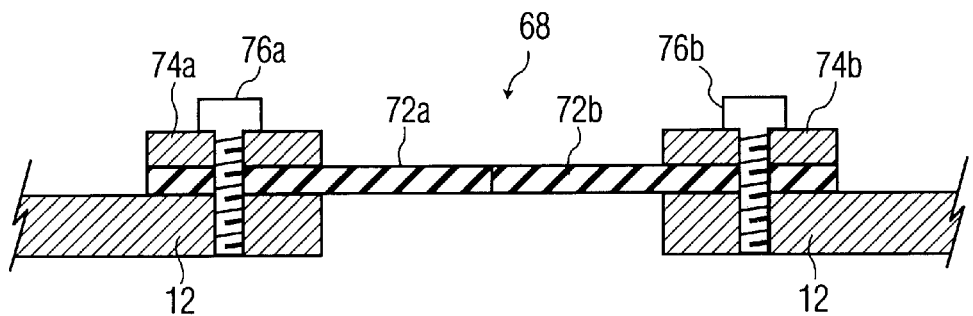
FIG. 6B is a cross-sectional view taken at lines 6B—6B in FIG. 6A.

Referring again to FIG. 2B, platform 12 and cone 18 require modification to accommodate the high degree of tilting made possible by use of the mounting arrangement for the impeller as shown in FIG. 3, for instance. FIGS. 6A and 6B show aspects of this modification.

FIG. 6A shows a top view of an aft portion of hovercraft 40 of FIG. 2A, for instance, including impeller 14 surrounded by cone 18 positioned above platform 12, and a mounting arrangement for the impeller. An outer periphery of the craft is shown at 66, and constitutes the bulging out of a floatation skirt of the craft that is also shown, but not numbered, in FIGS. 2A–2B. A channel arrangement 68 can receive a portion of support arm 58 when the impeller is substantially titled to direct its airstream generally in the aftward (i.e., rearward) direction. However, the impeller can still rotate about its transverse axis (see, e.g., FIG. 3), while a portion of support arm 58 is received within channel arrangement 68. A channel arrangement 70, symmetrical with channel arrangement 68, can likewise receive a portion of support arm 60 when the impeller is substantially tilted to direct its airstream generally in the foreword direction. In this condition, the impeller can be rotated about its transverse axis (see, e.g., the axes of rotation legend in FIG. 3).

FIG. 6B shows a cross section of channel arrangement 68 taken on line 6B—6B of FIG. 6A. FIG. 6B shows preferably elastomeric material sheets 72a and 72b, which separate from each other to allow passage of support arm 58. Metal strips 74a and 74b secure sheets 72a and 72b to platform 12 with the aid of rivets or bolts 76a, 76b, etc. Flaps 72a and 72b may comprise an oil-resistant elastomer such as neoprene rubber of 3 millimeters thickness, for instance.

Figure 7:
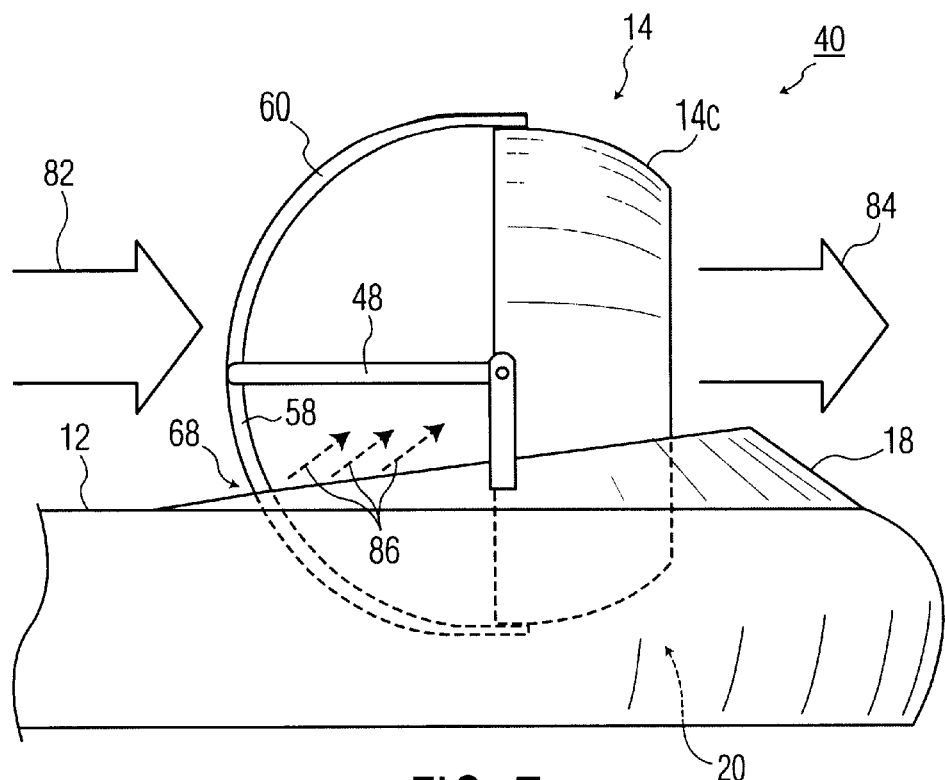
FIG. 7 is a simplified side view of a portion of portion of the hovercraft of FIG. 2A, for instance.

Finally, FIG. 7 is a simplified side view of a portion of craft 40 showing further details of channel arrangement 68 receiving support arm 68, for instance. That portion of support arm 58 passing through channel arrangement 68 may simply pass downwardly within lift air chamber 20.

II. Sealing the Orifice to the Lift Air Chamber Upstream of the Impeller

The next series of figures illustrate various ways to seal orifice 28 (FIG. 2B) to the lift gas chamber 20 to as to avoid the problem of a titled impeller drawing into its intake lift air from the lift air chamber. Previously discussed FIG. 7 illustrates the problem, referring to which intake air 82 shown in a desired path passes through impeller 14 and exits as a high pressure airstream 84. However, in the absence of the present inventive feature of sealing the orifice to the lift air chamber upstream of the impeller, part of the air intake into impeller 14 could be that shown by dashed-line arrows 86, which constitutes air from the lift air chamber 20. If a substantial amount of such airflow 86 is allowed to occur, lifting of the craft would be impaired.

Figure 8:
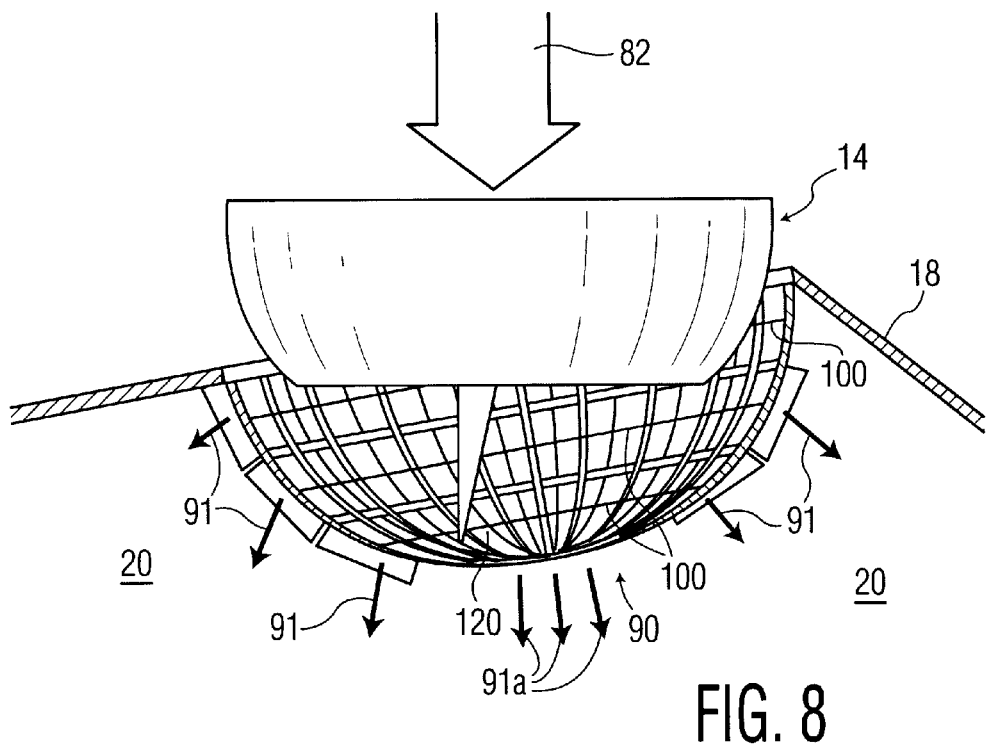
FIG. 8 is a simplified and diagrammatic side view, partially cut away and partially in cross section, of the impeller, cone, and an arrangement of one-way valves.

FIG. 8 shows a preferred way to prevent the unwanted airflow 86 shown in FIG. 7. A sealing arrangement 90 includes a plurality of one-way flapper valves, detailed below. These valves allow high pressure lift air from the fan to open flapper valves that are subject to the high pressure air so that such air can enter lift air chamber 20. All flapper valves on which high pressure air from the impeller impinges will open as indicated in association with airflows 91, although not all valves are shown open in FIG. 8. On the other hand, in the presence of suction from the impeller (e.g., in FIG. 7, suction from the left-shown side of the impeller), the flapper valves close to prevent air from being withdrawn from the lift air chamber. Airflow 91a occurs without the need for flapper valves in the central portion of arrangement 90, as will be explained below.

Figure 9:
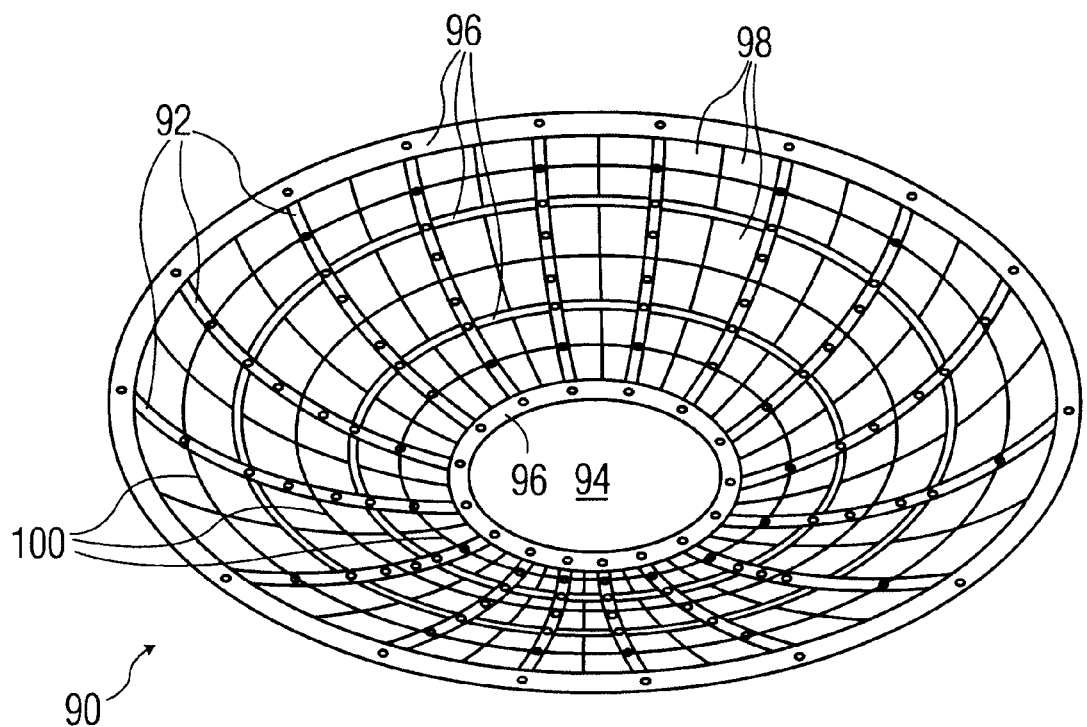
FIG. 9 is a top perspective view of the arrangement of one-way valves shown in FIG. 8.

FIG. 9 shows arrangement 90 of one-way valves from a top perspective. Arrangement 90 comprises anchoring ribs 92 that preferably extend radially outwardly from a medial position 94. Transverse ribs 96, each preferably being circular, attach to adjacent anchoring ribs 92. Medial position 94 is bounded by a transverse rib 96, to which anchoring ribs 92 are attached. Flapper valves 98, detailed below, are anchored to anchoring ribs 92. Three rows or tiers of flapper valves are shown, separated by transverse ribs 96, although a different number of tiers of flapper valves could be used (e.g., four). Wires 100, detailed below, may be used prevent adjacent flapper valves from moving upwardly, past their associated anchoring and support ribs. Such unwanted upward movement of the flapper valves would allow lift air to escape upwardly from the lift air chamber. Incidentally, no flapper valves are located in the immediate vicinity of medial region 94. This is acceptable since, although not shown in FIG. 9, this region is covered by impeller shrouding 14a (e.g., FIG. 7), when the impeller is tilted at 90 degrees from vertically downwardly.

Figure 10A:
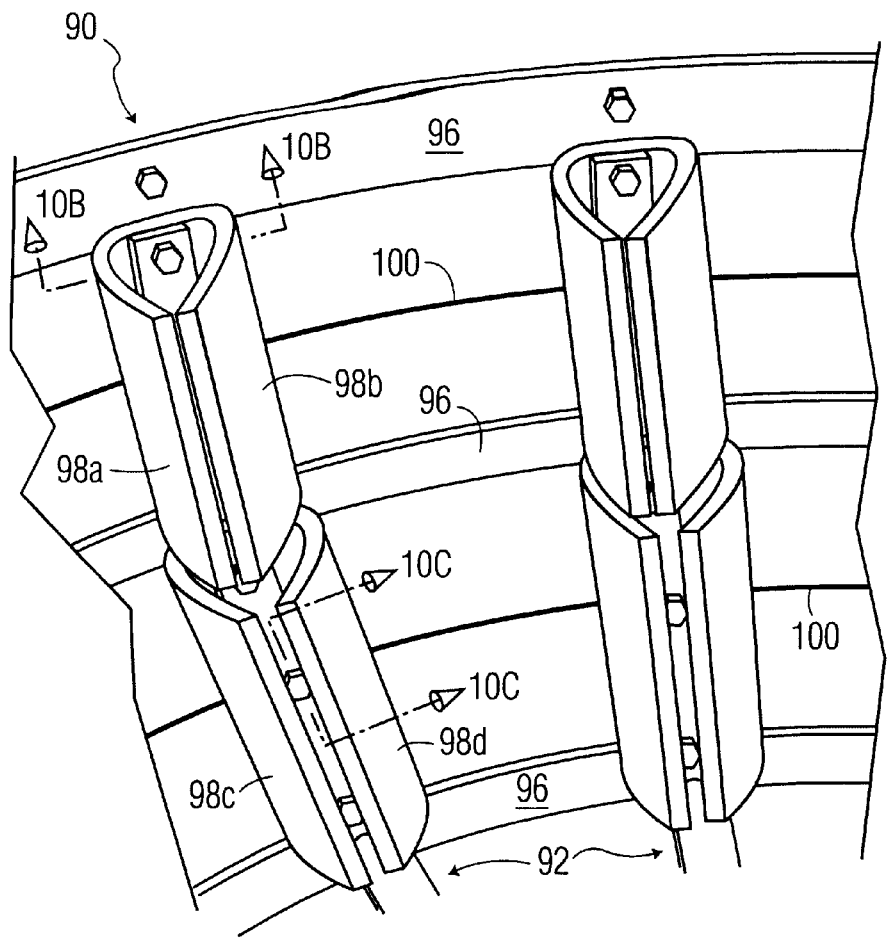
FIG. 10A is a detail view of a portion of the one-way valves shown in FIG. 8, from the underside of an arrangement of one-way valves.

FIG. 10A details key components of arrangement 90 of FIGS. 8 and 9, from the underside of the arrangement. Anchoring ribs 92 are shown attached by rivets, etc., to transverse ribs 96. Flapper valves 98a, 98b, 98c and 98d, for instance, are anchored to anchoring ribs 92 as detailed below. These valves preferably comprise elastomeric material that is resistant to oil, which may originate from lubrication oil, for instance, used in the impeller. Neoprene in sheet form with a thickness of 3 millimeters may be used, for instance.

To prevent valves 98a–98d from being pulled upwardly from their adjacent ribs, and thus to defeat the intended one-way valving, transverse supports 96 serve to delimit such movement. Serving a similar purpose, wires 100, which are transverse to anchoring ribs 92, prevents the vertical central portion of adjacent valves 98c and 98d from being pulled upwardly from their adjacent ribs, by stopping such unwanted movement of the valves.

Figure 10B:
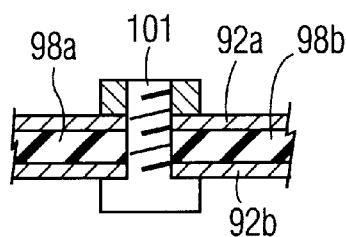
FIG. 10B is a cross-sectional view taken at lines 10B—10B in FIG. 10A.
Figure 10C:
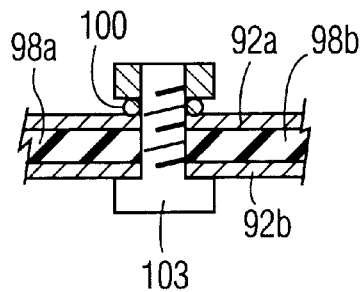
FIG. 10C is a cross-sectional view taken at lines 10C—10C in FIG. 10A

FIG. 10B shows how flapper valves 98a and 98b are sandwiched between anchoring ribs 92a and 92b, held together by a rivet or bolt 101. FIG. 10C shows a similar arrangement, but where a bolt or rivet 103 holds a wire 100 in position. More particularly, wire 100 is looped around the bolt or rivet 103.

Figure 10D:
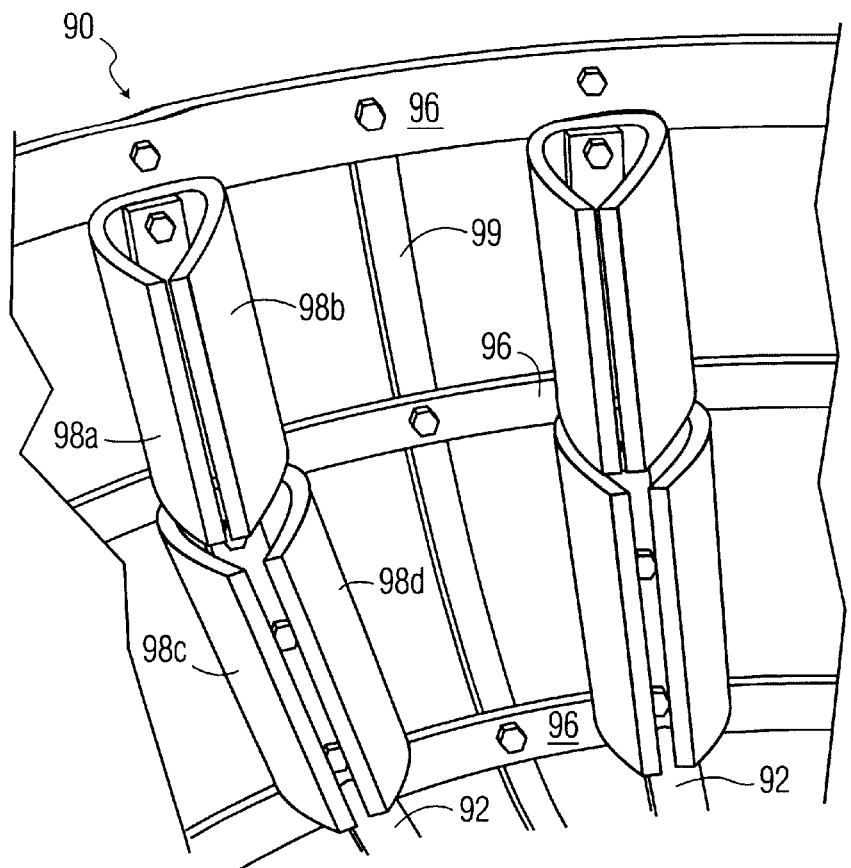
FIG. 10D is similar to FIG. 10A, showing the alternative use of ribs generally parallel to the anchoring ribs of FIG. 10A for delimiting movement of the illustrated flapper valves.

FIG. 10D shows an alternative to the use of wires 100 in FIG. 10A. Thus, FIG. 10D shows additional ribs such as 99 for delimiting the movement of flapper valves in the same general manner as the use of wires 100 in FIG. 10A. Such additional ribs are oriented generally parallel to anchoring ribs 92.

Returning to FIG. 8, operation of arrangement 90 is shown with impeller 14 titled vertically downwardly for maximum lift. Intake air 82 that becomes pressurized air from the impeller blows exits the impeller as airstreams 91 and opens the one-way valves (e.g., 98a–98d, FIG. 10A). Opening of the valves is shown in association with airstreams 91, although in actuality all one-way valves subject to the pressurized air open. Airstream 91 a does not open flapper valves, because it merely passes through medial position 94 (FIG. 9) of arrangement 90.

Figure 11:
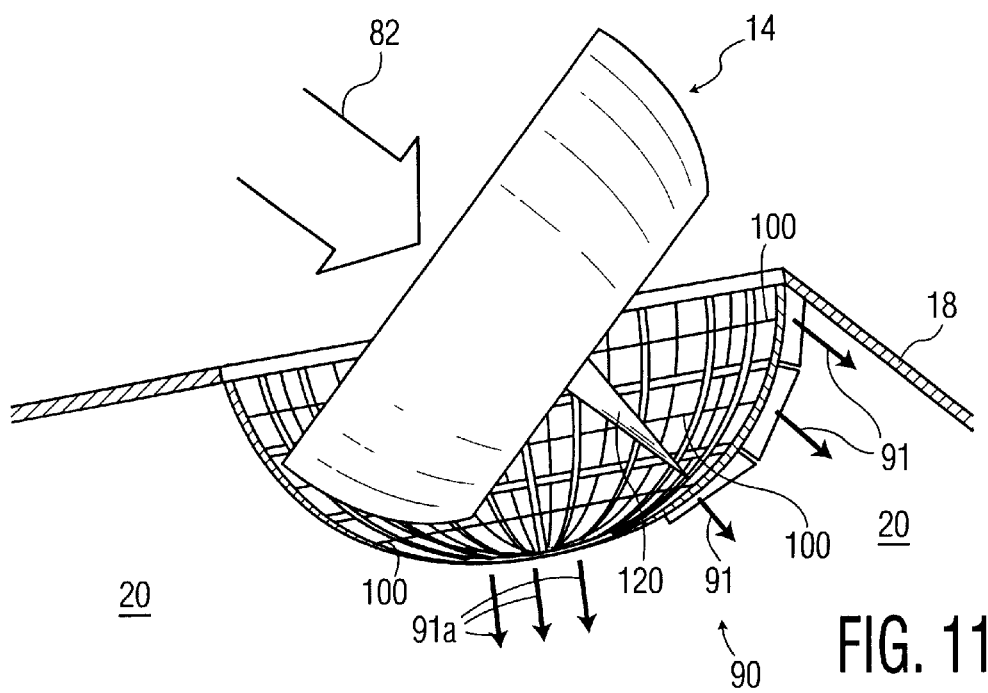
FIG. 11 is similar to FIG. 8, showing the impeller titled about 45 degrees from vertically downward.

FIG. 11 shows arrangement 90 when impeller 14 is titled about 45 degrees from vertically downward. In this position, impeller 90, which receives intake air 82, directs high pressure air at one-way valves on the right-shown side of the impeller. The valves receiving such high pressure air open, by moving downwardly, while valves not subject to the high pressure air remain closed. Open valves are associated with airstreams 91, although in actuality all one-way valves subject to the pressurized air open.

Figure 12:
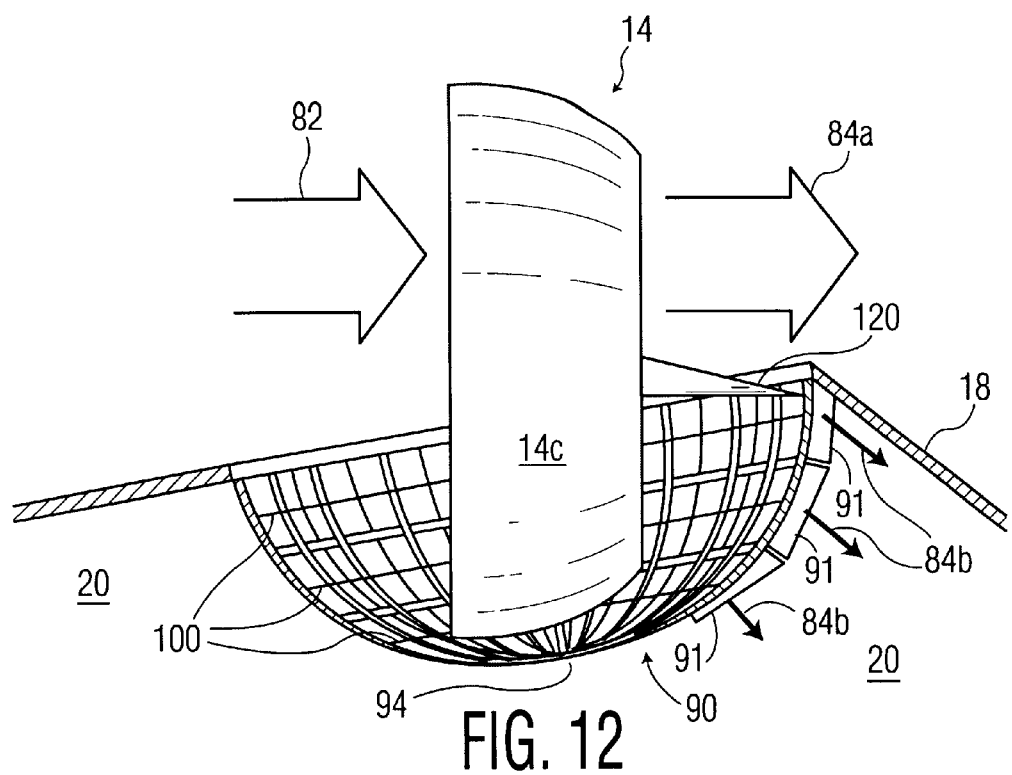
FIG. 12 is similar to FIG. 8, showing the impeller titled substantially 90 degrees from vertically downward.

Finally, FIG. 12 shows impeller 14 titled at substantially 90 degrees from vertically downward. In this position, the impeller provides maximum thrust, while also providing lift air. Intake air 82 that becomes pressurized by the impeller results in high pressure air 84a above a stator 120 (described below) and high pressure air 84b below the stator. The valves to the right of the impeller, on which the high pressure airstream 84 from the impeller is directed, open. Only valves associated with airstreams 91 are shown open, although in actuality, all valves on which high pressure air 84b impinges open. Meanwhile, the valves to the left of the fan, not receiving such high pressure air, but more likely being under suction from the intake to the impeller, remain closed so as to prevent escape of lift air from the light air chamber 20. Finally, pressurized air does not pass straight beneath impeller shrouding 14c in the vicinity of medial position 94 of arrangement 90 in substantial amount. This is because the impeller shrouding blocks the opening in the vicinity of medial position 94 visible in FIG. 9.

Arrangement 90 (e.g., FIG. 9) of one-way valves, as described above, provides a simple system for preventing loss of airflow from the lift air chamber when the impeller tilts away from vertically downward. By not requiring mechanized components, arrangement 90 desirably is a passive system.

Figure 13:
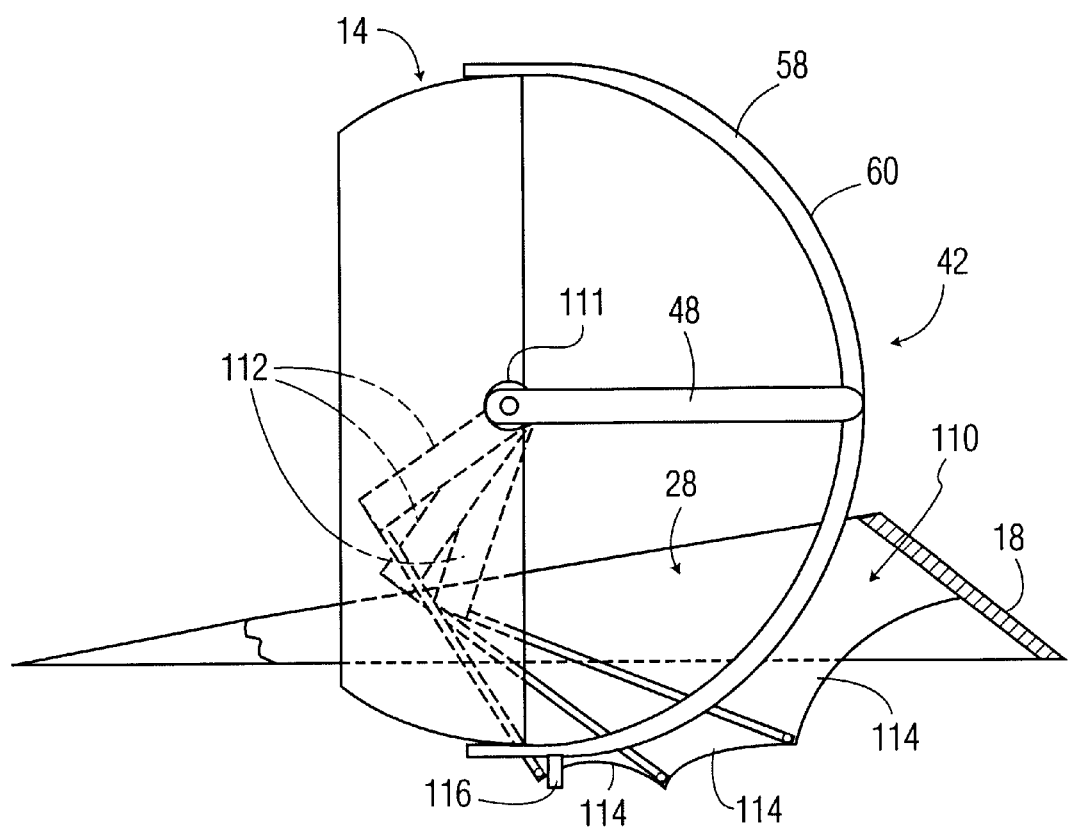
FIG. 13 is a simplified side view, partially cut away and partially in cross section, of the impeller, cone, and an alternative arrangement of bellows for sealing the lift air chamber upstream of the impeller.

FIG. 13 shows an alternative to the foregoing arrangement 90, which also does not require mechanized components. A bellows arrangement 110 seals the lift air chamber 28 upstream as shown. Another bellows arrangement (not shown), symmetrical to the arrangement shown, could be mounted so as to be operative on the left-shown side of the impeller.

Bellows arrangement 110 includes two mounts to the previously shown (but not presently shown) mounts 44a and 46a (FIG. 3) of the impeller mounting framework 42. One of the bellows mounts is positioned at 111, and another bellows mount is at the opposite sides of impeller 14, not visible in FIG. 13. Bellows arms 112 support fabric 114 in a similar manner as the ribs of an umbrella, and fabric 114 may comprise urethane-impregnated nylon for instance. The left-shown bellows arm 112 is preferably spring-biased at its mount 111 by means (not shown) to bias the bellows into a closed-up position, similar to the closing of an ordinary umbrella used to deflect rain.

To open the bellows, a post 115 mounted on support arm 60 of the impeller mounting framework 42 engages the left-most shown bellows arm 112 when the impeller is rotated to cause the post to travel sufficiently downwardly below cone 18. The opening of the bellows is akin to opening of an ordinary umbrella. Closing of the bellows occurs due to the above-mentioned spring-biasing of the left-most bellows arm, which closes the bellows arrangement.

Neither bellows arrangement 110, nor a symmetrical arrangement (not shown) on the left-shown side of the impeller, can be positioned transverse of the impeller. This is due to mounting of such arrangements on the mounts 44a and 36a (FIG. 3) for the impeller. Accordingly, lift air from the intake of the impeller when titled transversely at a high angle can escape from the lift air chamber. However, this problem is usually avoided in practice, since tilting of the impeller transversely beyond about 30 degrees is rare.

Further alternatives to the above-described one-way valve arrangement and the bellows arrangement for sealing the lift air chamber upstream of the impeller include the following. One alternative is the use of an eyelid arrangement such as shown in connection with FIGS. 15 and 16 of U.S. Pat. No. 3,827,627 mentioned in the Background of the Invention. However, such eyelid arrangement includes an eyelid occupying about 80 degrees of rotation of the impeller. From viewing FIG. 15 in the foregoing patent, it can be appreciated that each eyelid extends downwardly so far into the lift air chamber that it will either obstruct or deflect the downstream air from the impeller. This adversely affects lift of the craft.

Figure 14A:
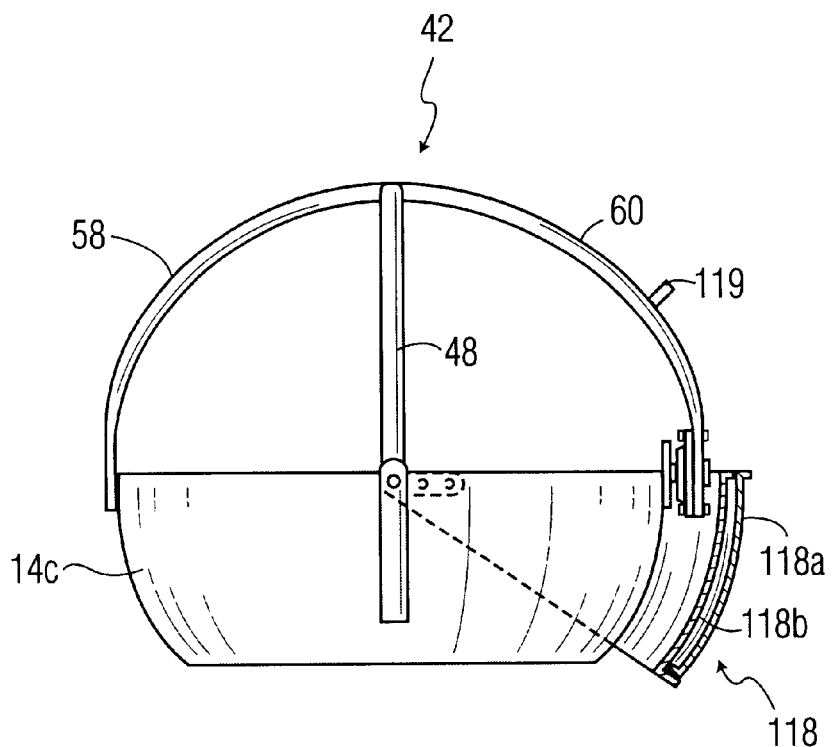
FIGS. 14A and 14B are similar to FIG. 13, but show respective simplified side views of an impeller, framework and eyelid arrangement for sealing the lift air chamber upstream of the impeller, with the eyelid arrangement in cross section.

It is preferred that two or more eyelids, such as shown in present FIG. 14A, telescoping with respect to each other, be used instead of the single eyelid shown in the foregoing patent. With this exception, the description of the eyelid arrangement in the foregoing patent applies. Referring to present FIG. 14A, an eyelid arrangement comprising outer eyelid section 118a and inner eyelid section 118b operate as follows. Post 119, similar to post 116 of the bellows arrangement of FIG. 13, will serve to open the telescoping eyelid arrangement when support arm 60 rotates clockwise, so as to rotate impeller shrouding 14c clockwise. Post 119 thereby rotates along the arc 18c so as to impinge upon, and move, inner eyelid section 118b downwardly.

The use of telescoping eyelids 111a and 118b helps to avoid the mentioned drawback of the eyelid extending so far downwardly that it interferes with the downstream lift air from the impeller. Additionally, the contracted eyelid sections should not extend downwardly to such an extent that they interfere with the downstream airflow from the impeller.

Figure 14B:
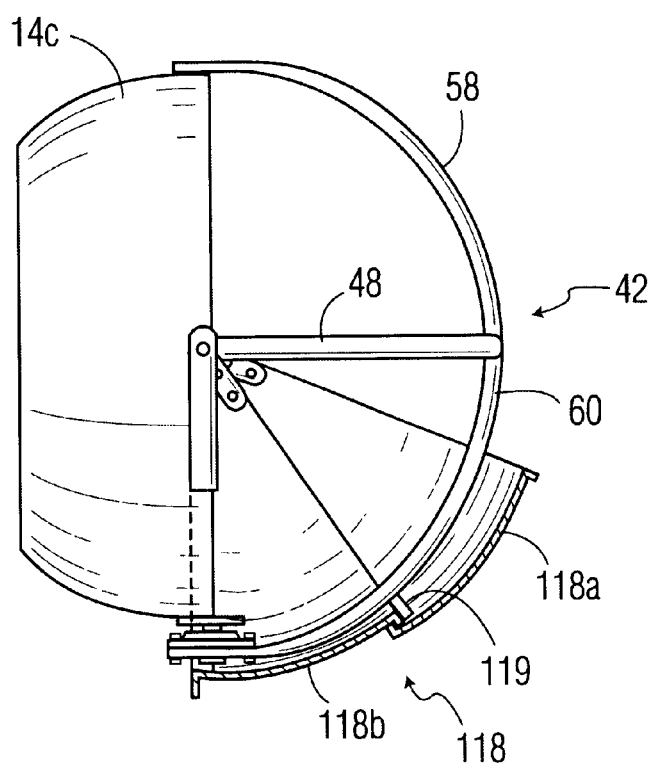

FIG. 14B shows eyelid arrangement 118 of FIG. 14B in a telescoped position when the impeller is tilted 90 degrees from straight down. In this position, eyelid sections 118a and 118b, telescoped with respect to each other, seal the lift air chamber upstream of the impeller.

As with the bellows arrangement shown in FIG. 13, a corresponding, telescoping eyelid arrangement, symmetrical to the arrangement shown in FIG. 14, would be included. Like the bellows arrangement, the eyelid arrangement does not seal the lift air orifice when the impeller is titled to a high angle in the transverse direction. However, this problem is usually avoided in practice, since tilting of the impeller transversely beyond about 30 degrees is rare.

III. Stator to Reduce Turbulence, Etc.

Figure 15:
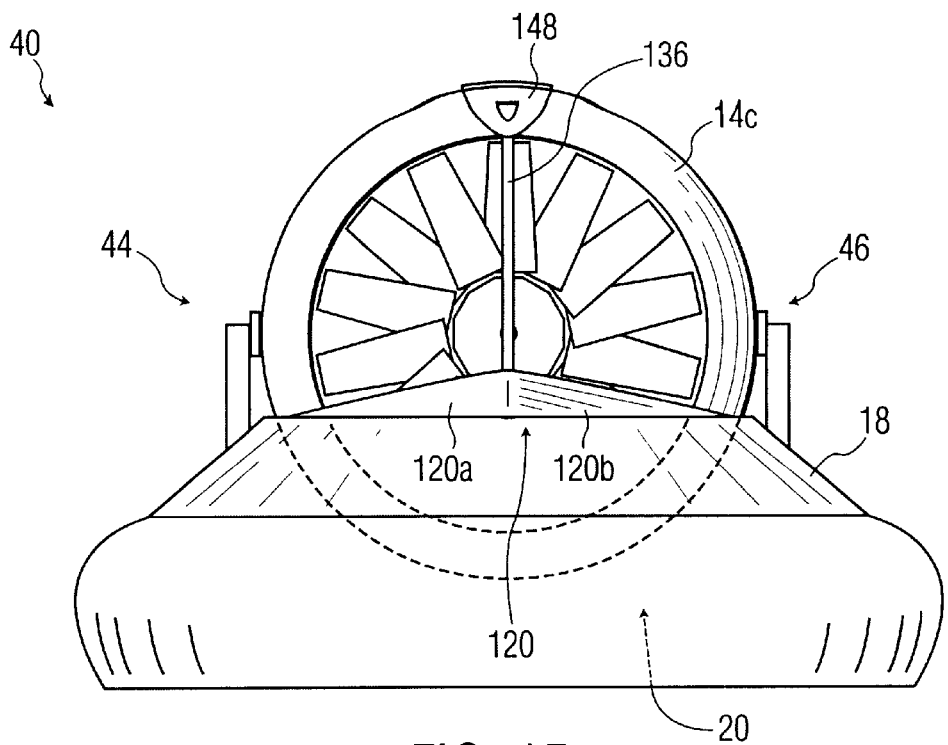
FIG. 15 shows a rear view of the hovercraft of FIG. 2B, showing a stator positioned downstream of the impeller.

A third area of innovation relates to the use of a stator to reduce turbulence, etc., associated with a high degree of tilt of the impeller. Element 120 in FIG. 12 shows a stator positioned downstream of impeller 14 so as to substantially seal the orifice to the lift air chamber (marked 28 in FIG. 2B) when the impeller is tilted at substantially 90 degrees from vertically downward. FIG. 15 shows a front view of stator 120, which has the appearance of a V-shape formed by left and right sides 120a and 120b, respectively. Other shapes may be used, the purpose being to substantially seal the lift air orifice when the impeller is substantially in the position shown in FIG. 12.

Figure 16:
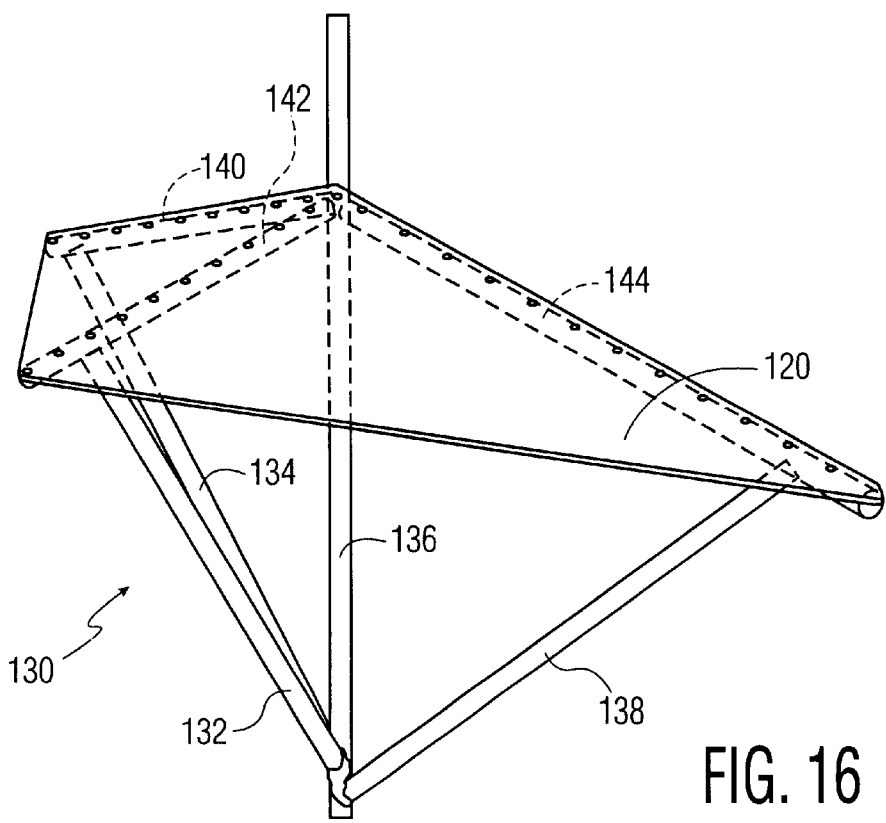
FIG. 16 shows framework for a stator and stator that can be used downstream of the impeller of FIG. 2A, for instance.

FIG. 16 shows a frame 130 for stator 120, which is desirably thin so as to not unduly limit airflow from the impeller. The stator may be made from aluminum of 3-millimeters thickness, for instance. Frame 130 may comprise generally vertical arms 132, 134, 136 and 138, and generally horizontal arms 140, 142 and 144. These arms may comprise tubular aircraft strut of 1.47 millimeters thickness formed to an outer diameter of 1.59 centimeters. The tubes are preferably welded together. Stator 120, which is generally triangular in shape, may be joined to the generally horizontal arms by rivets, as shown.

FIG. 15 shows generally vertical arm 136 attached to the upper portion of impeller shrouding 14c by a bracket 148. A similar bracket (not shown) can attach the lower portion of arm 136 to the impeller shrouding. Rather than attachment with brackets (e.g., 136, FIG. 15), impeller frame 130 could be integrally joined to the impeller shrouding.

When the impeller is substantially in the position shown in FIG. 12, i.e., about 90 degrees titled from vertically downward, the top portion of the pressurized airstream 84 from the impeller is directed above the orifice of the lift gas chamber 20, so as to constitute thrust. The bottom portion of the pressurized airstream 84 is directed into the lift gas chamber, so as to constitute lift. As discovered by the present inventors, stator 120 serves two purposes. First, it substantially prevents the upper airstream 84a used for thrust from drawing air from the lift air chamber 120. Second, it substantially reduces turbulence in the lower airstream 84b used for thrust. However, in the positions of the impeller shown in FIGS. 8 and 11, stator 120 does not serves the foregoing two purposes, but its effect on impeller performance is negligible.

References herein to various positions on a craft, such as fore, aft, transverse, etc., are used herein merely for convenience. The designer of a craft may wish to make the axis of rotation of the impeller defined by mounts 44 and 46 (e.g., FIG. 3) to be other than a fore-aft axis, for example. Preferably, the impeller mounts 44 and 46 (FIG. 3) are positioned along the fore-aft axis when using the bellows arrangement of FIG. 13 or the eyelid arrangement of FIGS. 14A and 14B. This position allows maximum titling of the impeller (e.g., 90 degrees) to obtain maximum foreword or aftward thrust, since the bellows and eyelid arrangements will normally be fixed in position forward or aftward of the impeller. When using the flapper valve arrangement of FIG. 9, for instance, the impeller mounts 44 and 46 (FIG. 3) can be oriented either the fore-aft axis or the right-left (transverse) axis, for instance.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. Airstream control system for a hovercraft that includes a platform and a lift gas chamber beneath the platform, the control system comprising:
   a) an impeller for receiving air at an inlet and discharging pressurized air at an outlet as an airstream; the impeller being positioned above an orifice of the lift gas chamber;
   b) the impeller being supported along a first axis transverse to the airstream and about which the impeller is rotatable by a first axis frame that is rotatable about a pair of first axis supports fixed to the platform;
   c) the impeller further being supported along a second axis transverse to the airstream and about which the impeller is rotatable by a second axis frame that is attached to the first axis frame and that comprises a first arm supporting a first point of the impeller and extending upstream of the impeller; and
   d) a first channel arrangement fixed to the platform that can receive the first arm of the second axis frame so as to allow a higher degree of tilting of a main axis of the impeller from vertically downward than in the absence of the first channel arrangement.

2. The airstream control system of claim 1, wherein the second axis frame and the first channel arrangement are so arranged as to allow the impeller to tilt from vertically downward to such a degree that the main axis of the impeller can tilt substantially 90 degrees from vertical.

3. The airstream control system of claim 1, wherein:
   a) the second axis frame includes a second arm extending upstream of the impeller and supporting a second point of the impeller; and
   b) a second channel arrangement is included that can receive the second arm of the second axis frame so as to allow a higher degree of tilting of the main axis of the impeller from vertically downward than in the absence of the second channel arrangement.

4. The airstream control system of claim 1, further comprising means to substantially seal the orifice of the lift gas chamber downstream of the impeller from upward flow of air.

5. The airstream control system of claim 1, further including:
   a) a stator positioned downstream of the impeller in the vicinity of the orifice of the lift chamber;
   b) the stator being operative when the main axis of the impeller is titled substantially 90 degrees from vertically downward so as to substantially prevent the airstream used for thrust from drawing air from the lift air chamber and to substantially reduce turbulence in the airstream used for thrust.

6. The airstream control system of claim 5, wherein the stator comprises a generally thin air-deflecting member positioned downstream of the impeller in such manner as to substantially seal the orifice of the lift chamber when the main axis of the impeller is tilted substantially 90 degrees from vertically downward.

7. The airstream control system of claim 6, wherein:
   a) the stator comprises two generally triangular sheets of material; and
   b) a periphery of each generally triangular sheet being supported by a torsionally more rigid frame.

8. The airstream control system of claim 5, further comprising means to substantially seal the orifice of the lift gas chamber downstream of the impeller from upward flow of air.

9. The airstream control system of claim 8, wherein the means to substantially seal the orifice of the lift gas chamber comprises a bellows arrangement mounted to rotate about the second axis.

10. The airstream control system of claim 8, wherein the means to substantially seal the orifice of the lift gas chamber comprises an eyelid arrangement mounted to rotate about the second axis.

11. The airstream control system of claim 10, wherein the eyelid arrangement comprises a plurality of eyelid sections so arranged in a telescoping manner as to not substantially interfere with the airstream.

12. The airstream control system of claim 1 in combination with the hovercraft.

13. Airstream control system for a hovercraft that includes a platform and a lift gas chamber beneath the platform, the control system comprising:
   a) an impeller for receiving air at an inlet and discharging pressurized air at an outlet as an airstream; the impeller being positioned above an orifice of the lift gas chamber;
   b) the impeller being supported along a first axis transverse to the airstream and about which the impeller is rotatable by a first axis frame that is rotatable about a pair of first axis supports fixed to the platform;
   c) the impeller further being supported along a second axis transverse to the airstream and about which the impeller is rotatable by a second axis frame that is attached to the first axis frame and that comprises a first arm supporting a first point of the impeller and extending upstream of the impeller;
   d) a first channel arrangement fixed to the platform that can receive the first arm of the second axis frame so as to allow a higher degree of tilting of a main axis of the impeller from vertically downward than in the absence of the first channel arrangement; and
   e) flapper valves anchored to anchoring ribs for sealing the lift gas chamber orifice downstream of the impeller; the anchoring ribs being arranged in a generally bowl-like shape with a convex side facing downwardly into the lift gas chamber orifice;
   f) the flapper valves each comprising a valve moveable from a position in which it blocks lift air from escaping from the orifice to a position in which it moves downwardly from the anchoring ribs so as to allow air flow into the orifice.

14. The airstream control system of claim 13, further comprising transverse ribs, arranged transverse to the anchoring ribs, for assisting in stopping movement of the flapper valves upwardly into the bowl-like shape.

15. The airstream control system of claim 14, further comprising transverse wires, arranged transverse to the anchoring ribs, for assisting in stopping movement of the flapper valves upwardly into the bowl-like shape.

16. The airstream control system of claim 13, further comprising ribs generally parallel to the anchoring ribs for assisting in stopping movement of the flapper valves upwardly into the bowl-like shape.

17. The airstream control system of claim 13, wherein the anchoring ribs extend radially outward from a central area of the bowl-like shape towards a periphery of the orifice.

18. The airstream control system of claim 17, wherein the transverse ribs comprise substantially circular supports arranged transverse to the anchoring ribs.

19. The airstream control system of claim 18, wherein adjacent portions of the anchoring ribs and the transverse ribs are connected to each other.

20. The airstream control system of claim 5, further including:
a) a stator positioned downstream of the impeller in the vicinity of the orifice of the lift chamber;
b) the stator being operative when the main axis of the impeller is titled substantially 90 degrees from vertically downward so as to substantially prevent the airstream used for thrust from drawing air from the lift air chamber and to substantially reduce turbulence in the airstream used for thrust.

21. The airstream control system of claim 5, wherein the stator comprises a generally thin air-deflecting member positioned downstream of the impeller in such manner as to substantially seal the orifice of the lift chamber when the main axis of the impeller is tilted substantially 90 degrees from vertically downward.

22. The airstream control system of claim 21, wherein:
a) the stator comprises a generally triangular sheet of material having a base located in the immediate vicinity of the outlet of the impeller and a projecting point spaced away from the base; and
b) rigid base frame portions being attached to the base of the stator and another rigid frame portion extending from a base frame portion to the projecting point and being attached the stator.

23. The airstream control system of claim 13 in combination with the hovercraft.

* * * * *